2,980,744
Patented Apr. 18, 1961

2,980,744

PREPARATION OF VISCOUS POLYMERS

Sterling E. Voltz, Brookhaven, Pa., assignor to Sun Oil Company, Philadelphia, Pa., a corporation of New Jersey No Drawing. Filed Dec. 18, 1959, Ser. No. 860,343

7 Claims. (Cl. 260—683.15)

This invention relates to the preparation of viscous polymers and more particularly concerns a process for polymerizing alpha-monoolefin hydrocarbons having three or more carbon atoms per molecule to form viscous oily polymers which have utility as additives for other oils or as lubricants per se.

In the polymerization of alpha-monoolefins which have three or more carbon atoms per molecule, those in which there is a substituent at the beta position generally are more easily polymerized than straight chain monoolefins or than those which have one or more substituents located other than at the beta position. The present invention is directed to the catalytic polymerization of the more difficultly polymerizable alpha-monoolefins, i.e. those which do not have a substituent at the beta position, for the purpose of producing viscous oily products.

According to the invention, alpha-monoolefins having the formula $$R-\overset{H}{\underset{}{C}}=\overset{H}{\underset{}{C}}H$$

wherein R is an alkyl radical having 1–8 carbon atoms, are polymerized by contacting such olefin in an inert organic liquid medium with a catalyst system in which the components are a copper halide distended on porous alumina together with an alkyl aluminum dihalide. It has now been found that such dispersions are highly effective catalytic systems for polymerizing the specified monoolefins, or mixture thereof, to viscous oily products. In contrast, it has been found that if alumina is omitted from the catalyst system, the combination of a copper halide and an alkyl aluminum dihalide produces a system which has relatively poor polymerizing activity.

In preparing the catalyst system of the present invention a copper halide, which can be either a cupric or cuprous halide such as $CuCl_2$, $CuCl$, $CuF_2$, $CuBr_2$, $CuBr$, or $CuI$, is deposited on granular alumina. This can be done by dissolving the copper halide in a suitable non-aqueous solvent, for example, an alcohol, acetone, dimethylformamide or various inorganic amines, thoroughly mixing the solution with the granular alumina preferably in amount such that little or no non-adsorbed solution remains, and thereafter evaporating the solvent preferably under reduced pressure and at a temperature below 150° C. The amount of copper halide incorporated in the alumina generally should be at least 1% by weight on the mixture and preferably is not more than 20%, although higher proportions, say up to 50%, can be used if desired. Typically, the copper halide in amount of about 10% by weight in the mixture will be used. The impregnated alumina thereafter is contacted with an alkyl aluminum dihalide, e.g. ethyl aluminum dichloride, preferably dissolved in an inert organic liquid which subsequently can function as the reaction medium for the polymerization reaction. Any organic liquid which will be inert under the reaction conditions can be used. Preferably, hydrocarbon liquids are employed, for example, hexanes, heptanes, octanes, cyclopentanes, cyclohexanes, benzene, toluene, xylenes, decalin and the like. Non-terminal olefins which will not react under the conditions employed during the reaction can also be used.

The aluminum compound employed in the foregoing catalyst system can be any monoalkyl aluminum dihalide wherein the alkyl group has 1–10 carbon atoms. The preferred compound is ethyl aluminum dichloride; however, its fluorine, bromine, or iodine analogues can be used with good results. Other alkyl radicals can be substituted for the ethyl group, for example, methyl, propyl, isobutyl, isooctyl or decyl radicals.

The polymerization reaction is carried out by contacting the above-described catalyst system with the monomeric olefin which can be introduced into the reaction vessel in either vapor or liquid form. The temperature of the system generally should be above 0° C. and may be as high as 150° C. or even higher. As a general rule the rate of polymerization increases as the reaction temperature is increased. The reaction can be conducted under atmospheric pressure if the boiling point of the reaction medium is above the reaction temperature employed, or an elevated pressure can be employed when the reaction temperature is above the normal boiling point of the reaction medium. If the monomeric olefin charge is a normally gaseous olefin such as propylene, it is advantageous to maintain an elevated pressure in the reactor since this increases the concentration of dissolved olefin in the reaction rate. During the course of the reaction it is desirable to stir the reaction mixture continuously in order to effect efficient contact between the reactant and the catalyst particles.

In preparing the reaction mixture the proportions of components can be varied widely, and the rate of reaction will depend to an extent on the proportions selected. As a general rule, it is desirable to use a volume ratio of the charge olefin to reaction medium in the range of 0.2 to 5 on a liquid basis. It is also desirable that the molar ratio of copper halide to the charge olefin be in the range of 0.0001 to 0.05 and more preferably 0.001 to 0.01, and that the molar ratio of the aluminum compound to the copper halide be in the range of 0.1 to 10 and more preferably 0.2 to 5. The reaction temperature selected will depend to an extent upon the particular olefin to be polymerized but generally will be in the range of 0° to 150° C. and more preferably 50° to 100° C.

The above-described procedure results in the formation of viscous oily polymers which may or may not remain dissolved in the reaction medium depending upon the experimental conditions and the particular monomer used. Upon completing the reaction a polar compound such as methanol is added to the reaction mixture to deactivate the catalyst system. The oily polymer product can be separated from the catalyst and reaction medium by filtration, extraction and/or distillation. The resulting product can be utilized as a lubricant or can be used to thicken other oils and improve viscosity index. It can also be blended with other materials, for example, petroleum wax, to impart desirable characteristics. The products of the invention can, if desired, be hydrogenated before final use in order to eliminate terminal unsaturation.

The following examples illustrate the invention more specifically:

Example I

A non-extracted type of alumina (Alcoa F-1) which had a sodium content reported as $Na_2O$ of about 0.8% by weight and which had a surface area of about 210 square meters per gram was used in the present example. A solution composed of 10 g. $CuCl_2$ in 49 ml. of methyl alcohol was added to 90 g. of the alumina and was thoroughly admixed therewith by shaking. The methyl alcohol was then evaporated by heating the mixture at 80° C. in a vacuum oven. The impregnated alumina had a green color and a $CuCl_2$ content of about 10% by weight.

A mixture was prepared composed of 100 ml. of an inert reaction medium consisting of n-heptane, 11 g. of the $CuCl_2$-impregnated alumina and 3 g. of ethyl aluminum dichloride. Contact between the ethyl aluminum dichloride and the impregnated alumina caused the latter to darken somewhat. This mixture was heated and maintained at 50° C. for one hour to insure equilibration of the components. The charge olefin, 4-methylpentene-1, was then added in a volume amount equivalent to the n-heptane and the mixture was stirred for 24 hours with the temperature being maintained at about 50° C. Methanol was then added, the mixture was filtered to separate catalyst particles and the filtrate was distilled to remove the n-heptane and methanol. A viscous oily product was obtained in a yield of roughly 40% by weight based on the 4-methylpentene-1 charged to the system.

A higher yield of viscous polymer product can be obtained by operating in the above manner but employing a higher reaction temperature, e.g. by employing a temperature of 100° C. while maintaining the system under pressure.

*Example II*

This example was carried out in the same manner as Example I except that an acidic alumina (Alcoa F-10) having an $Na_2O$ content of about 0.1%, a chlorine content of about 0.6% and a surface area of 100 square meters per gram was employed. Essentially the same results were obtained.

*Example III*

When the processes of Examples I and II are repeated except that CuCl is substituted for $CuCl_2$, substantially the same results are obtained.

*Example IV*

By way of contrast, when the alumina is omitted from the catalyst system while otherwise using ethyl aluminum dichloride together with either CuCl or $CuCl_2$ in the proportions and under the conditions described for Example I, only about 10% of viscous oily polymer is obtained. This shows that the presence of the alumina is essential for obtaining a catalyst system which is effective for the present purpose.

The substitution of other halogen analogues for the copper chlorides used in the foregoing examples gives substantially equivalent results.

The polymerization of other alpha-olefins having 3–10 carbon atoms and which do not have any substituent in the beta position can be carried out in the manner above described with substantially similar results. For example, alpha-olefins such as propylene, butene-1, 3-methylbutene-1, 3-ethylbutene-1, pentene-1, hexene-1, 4-methylpentene-1, 3,4-dimethylpentene-1, octene-1, vinylcyclohexane, 4,4-dimethylpentene-1, decene-1 and 5-ethyl-4,4-dimethylhexene-1 can be polymerized in accordance with the invention to yield viscous oily polymers.

This application is a continuation-in-part of my copending application Serial No. 773,164, filed November 12, 1958, now abandoned.

I claim:

1. Polymerization method for forming viscous polymers which comprises contacting, under polymerizing conditions including a temperature in the range of 0–150° C. and in an inert hydrocarbon liquid medium, an alpha monoolefin having the formula

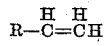

wherein R is an alkyl radical having 1–8 carbon atoms, with a catalyst system composed of a copper halide distended on porous alumina in combination with an alkyl aluminum dihalide, the molar ratio of the alkyl aluminum dihalide to the copper halide being in the range of 0.1 to 10.

2. Method according to claim 1 wherein said copper halide is selected from the group consisting of CuCl and $CuCl_2$.

3. Method according to claim 1 wherein said alkyl aluminum dihalide is a dichloride.

4. Method according to claim 3 wherein said alkyl aluminum dihalide is ethyl aluminum dichloride.

5. Method according to claim 1 wherein the polymerizing conditions include a temperature in the range of 50–100° C.

6. Method according to claim 5 wherein said alpha-monoolefin is 4-methylpentene-1.

7. Method according to claim 6 wherein the copper halide is selected from the group consisting of CuCl and $CuCl_2$ and the alkyl aluminum dihalide is ethyl aluminum dichloride.

References Cited in the file of this patent

UNITED STATES PATENTS

| | | |
|---|---|---|
| 2,082,518 | Ruthruff | June 1, 1937 |
| 2,387,517 | Kraus | Oct. 23, 1945 |
| 2,417,872 | Hill et al. | Mar. 25, 1947 |
| 2,827,446 | Breslow | Mar. 18, 1958 |
| 2,909,512 | Bruce | Oct. 20, 1959 |

FOREIGN PATENTS

| | | |
|---|---|---|
| 682,420 | Great Britain | Nov. 12, 1952 |